Patented Feb. 27, 1945

2,370,592

UNITED STATES PATENT OFFICE 2,370,592

SULPHAURO COMPOUNDS AND PROCESSES FOR THEIR PRODUCTION

Nelson R. Trenner and Frederick A. Bacher, Westfield, N. J., assignors to Merck & Co., Inc., Rahway, N. J., a corporation of New Jersey No Drawing. Application December 13, 1941,
Serial No. 422,924

8 Claims. (Cl. 260—430)

This invention relates to organic gold compounds, and more particularly to the synthesis of pure organic sulphauro compounds.

We have now discovered an efficient and practicable process whereby organic sulphauro compounds may be prepared directly in analytically pure form.

According to our invention, aurous cyanide or its aurocyanide complex ion, such as a cyanaurite of the formula $MAu(CN)_2$, where M is an alkali metal, is reacted with organic mercapto compounds.

Fundamentally, the reaction of our invention may be illustrated by the following equation:

$$R-SH + Au^+ \rightarrow R-SAu + H^+$$

where R is the parent grouping of the mercapto compound.

The reaction is general for organic mercapto compounds and is applicable to both aliphatic and aromatic sulphhydryl compounds, including, for example, mercapto succinic acid, cysteine hydrochloride, p-mercapto-acetanilide, cetyl mercaptan, rhodanine, etc.

Aurous cyanide and its auro cyanide complex ions are among the very few stable compounds of aurous gold. Their use does not give rise to side reactions such as occur when auric chloride or aurous iodine are used. Aurous iodide is especially unsatisfactory because it is intrinsically unstable, spontaneously decomposing into gold and free iodine. When aurous iodide is reacted with mercapto succinic acid, for example, the iodine attacks the acid and converts it to the disulphide with the result that considerable losses of gold occur and "impurities" are introduced into the system which experience has shown are impossible to remove from the final product.

Furthermore, our process has the advantage that hydrogen cyanide is formed in the reaction and simultaneously provides a protective, non-oxidizing environment. The hydrogen cyanide is subsequently readily lost by volatilization, leaving an analytically pure auro compound.

The following examples illustrate methods of carrying out the present invention, but it is to be understood that these examples are given by way of illustration and not of limitation.

Example I

One mol (223 gms.) of aurous cyanide is suspended in about 800 cc. of water.

A solution of 2.75 mols (415 gms.) of mercapto succinic acid in 1270 cc. of water is added to the suspension. The mixture is heated on a steam bath until practically all the solid material is dissolved. The heating time should not exceed 30 minutes if aurous cyanide of the proper activity is used. The reaction should be carried out in a good hood because large amounts of hydrogen cyanide are evolved.

The solution is cooled to room temperature, filtered clear of any extraneous solids, and evaporated to dryness on a steam bath. This step also should be carried out in a good hood because hydrogen cyanide is lost during the evaporation.

The solid residue is triturated with hot ethyl acetate (on a steam bath) using three or four portions. The residual solid is filtered off and washed with hot ethyl acetate. This treatment removes unreacted thiomalic acid which may be recovered from the ethyl acetate by simple evaporation. The filter cake of aurothiomalic acid is dried in vacuo at 100° C. for several hours. The aurothiomalic acid thus prepared is analytically pure, is an almost white powder having no melting point, is freely soluble in water, and methanol, and its aqueous solution has a pH of about 3.2.

The reaction may be illustrated as follows:

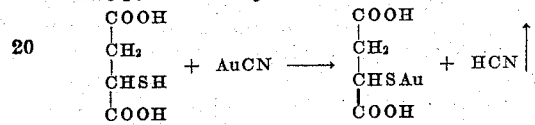

Analysis of the aurothiomalic acid thus obtained:

|  | Au | C | H | N |
|---|---|---|---|---|
| Found | 56.75 | 13.86 | 1.55 | 0.00 |
| Theory | 56.96 | 13.86 | 1.45 | 0.00 |

Example II

A solution of 28.4 gms. of gold chloride acid yellow Merck in 100 cc. of water is added slowly to a solution of 0.07 mol of sodium bisulphite, 0.275 mol of potassium hydroxide and 0.138 mol of potassium cyanide in about 150 cc. of water. The mixture is heated at 100° C. for a short time. Any extraneous solids are filtered off and the cold filtrate is added to a solution of 10.9 gms. of cysteine hydrochloride in about 80 cc. of 2.5 NHCl. Hydrogen cyanide is removed from the reaction mixture by passing nitrogen through it. The white insoluble, analytically pure aurocysteine which forms is filtered off and washed free of chloride with pure water.

This reaction may be illustrated as follows:

(1) $AuCl_3.HCl + NaHSO_3 + 4KOH + 2KCN$
$\longrightarrow KAu(CN)_2 + KNaSO_4 + 4KCl + 3H_2O$

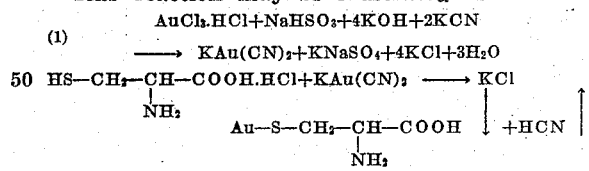

Analysis of the aurocysteine thus obtained:

|  | C | H | Au |
|---|---|---|---|
| Found | 11.36 | 1.93 | 62.45 |
| Theory | 11.35 | 1.91 | 62.41 |

Example III

About 6.7 gms. of aurous cyanide suspended in 25 cc. of water is added to 10 gms. (100% excess) of p-acetaminothiophenol (p-mercapto-acetanilide) prepared by the method of Zincke & Jörg (Ber. 42, 3362–1908) and Hinsberg (Ber. 39, 2429–1906). p-sulphauro-acetanilide separates. It is insoluble in water and acetone, gradually decomposes when heated but does not melt.

This reaction may be illustrated as follows:

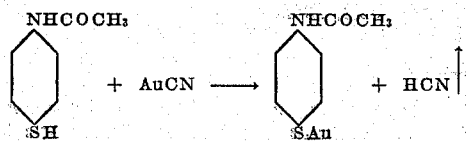

Analysis of the p-sulphauro-acetanilide thus obtained:

|  | Au | C | H |
|---|---|---|---|
| Found | 54.0 | 26.43 | 2.29 |
| Theory | 54.26 | 26.44 | 2.21 |

Aurothio acids such as aurothiomalic acid, for example, may be converted to salts by treating with an appropriate base as, for example, calcium hydroxide.

Example IV

An alcoholic solution of cetyl mercaptan is treated with 50% of the theoretical amount of active aurous cyanide and the suspension refluxed until a large fraction of the solid has disappeared. Hydrogen cyanide is evolved slowly during this process. The solids are filtered off from the hot solution, and the filtrate evaporated on the steam bath. A light yellow, amorphous, residue is obtained.

The cetyl auromercaptan so obtained does not redissolve in ethanol. It is insoluble in all the usual solvents, both hot and cold.

We have found that when aurous cyanide is used in the reaction, there is considerable variation in the speed and ease of the reaction, depending upon the physical state of the aurous cyanide. Therefore, we have devised a special process for preparing aurous cyanide. Certain commercial grades of aurous cyanide also may be used in our process. However, if such a commercial grade of aurous cyanide is used, it should be thoroughly tested for reactivity prior to use in the reaction.

Our improved process for the production of aurous cyanide is illustrated in the following example.

Example V

A solution of one mol (394 gms.) of reagent gold chloride, $AuCl_3 \cdot HCl \cdot 3H_2O$, in one liter of water is poured slowly and with stirring into a solution prepared by dissolving 4 mols (168 gms. 95% NaOH) sodium hydroxide, one mol (110 gms. 95% $NaHSO_3$) sodium bisulphite, and 2 mols (103 gms. 95% NaCN) sodium cyanide, in the order given, in 2.5 liters of water. A white precipitate is formed, which dissolves on heating. The mixture is heated on a steam bath for about ½ hour. Then, in a good hood, an equal volume (3.5 liters) of concentrated hydrochloric acid is added. Heating is continued in an open dish in the hood for one hour, with frequent stirring. The yellow precipitate of aurous cyanide is collected on a glass filter and rinsed with water.

The aurous cyanide is washed by suspension in approximately 10 liters of water, and filtered. This is repeated at least once after the filtrate is found to be free from chloride by testing with silver nitrate. Yield of aurous cyanide, 95%.

The aurous cyanide should be kept moist and in the dark until it is used.

Modifications may be made in carrying out the present invention, without departing from the spirit and scope thereof, and we are to be limited only by the appended claims.

We claim:

1. The process comprising reacting an organic mercapto compound with a substance selected from the group consisting of aurous cyanide and alkali metal aurocyanides, to form the corresponding auro thio compound.

2. The process comprising reacting a mercapto compound of the formula R—SH where R is an alkyl radical with a substance selected from the group consisting of aurous cyanide and alkali metal aurocyanides, to form the corresponding auro thio compound.

3. The process comprising reacting an organic mercapto compound with an aurocyanide of the formula $MAu(CN)_2$, where M is an alkali metal, to form the corresponding auro thio compound.

4. The process comprising reacting an organic mercapto compound with aurous cyanide, to form the corresponding auro thio compound.

5. The process comprising reacting a water-soluble salt of cysteine with a substance selected from the group consisting of aurous cyanide and alkali metal aurocyanides, to form the corresponding auro cysteine.

6. The process comprising reacting cysteine hydrochloride with a substance selected from the group consisting of aurous cyanide and alkali metal aurocyanides, to form the corresponding auro cysteine.

7. The process comprising reacting mercapto succinic acid with a substance selected from the group consisting of aurous cyanide and alkali metal aurocyanides, to form the corresponding auro thiomalic acid.

8. The process comprising reacting cetyl mercaptan with a substance selected from the group consisting of aurous cyanide and alkali metal aurocyanides, to form the corresponding cetyl auro mercaptan.

NELSON R. TRENNER.
FREDERICK A. BACHER.